US006624419B2

(12) United States Patent
Ozarowski et al.

(10) Patent No.: US 6,624,419 B2
(45) Date of Patent: Sep. 23, 2003

(54) APPARATUS FOR SENSING AND CONTROLLING FLUIDIZATION LEVEL

(75) Inventors: Ryszard S. Ozarowski, Marietta, GA (US); William T. Sutton, Charleston, SC (US)

(73) Assignee: Hill-Rom Services, Inc., Batesville, IN (US)

(*) Notice: Subject to any disclaimer, the term of this patent is extended or adjusted under 35 U.S.C. 154(b) by 0 days.

(21) Appl. No.: 10/175,664

(22) Filed: Jun. 20, 2002

(65) Prior Publication Data

US 2002/0157187 A1 Oct. 31, 2002

Related U.S. Application Data

(63) Continuation of application No. 09/614,647, filed on Jul. 12, 2000.

(51) Int. Cl.[7] .............................................. G01N 21/85

(52) U.S. Cl. ................................ 250/341.1; 250/341.8; 250/343

(58) Field of Search ........................... 250/341.1, 341.2, 250/341.8, 343, 396.1, 357.1

(56) References Cited

U.S. PATENT DOCUMENTS

| | | | |
|---|---|---|---|
| 4,637,083 A | 1/1987 | Goodwin | |
| 4,694,520 A | 9/1987 | Paul et al. | |
| 4,833,457 A | 5/1989 | Graebe, Jr. | |
| 4,914,760 A | 4/1990 | Hargest et al. | |
| 4,942,635 A | 7/1990 | Hargest et al. | |
| 4,967,431 A | 11/1990 | Hargest et al. | |
| 5,029,352 A | 7/1991 | Hargest et al. | |
| 5,036,559 A | 8/1991 | Hargest | |
| 5,278,412 A * | 1/1994 | DeThomas et al. | 250/343 |
| 5,437,178 A | 8/1995 | Esin et al. | |
| 5,644,299 A | 7/1997 | Cruickshank | |
| 6,529,751 B1 * | 3/2003 | Van Driel et al. | 600/322 |

FOREIGN PATENT DOCUMENTS

FR 2550442 A1 2/1985

* cited by examiner

*Primary Examiner*—Constantine Hannaher
*Assistant Examiner*—Timothy Moran
(74) *Attorney, Agent, or Firm*—Barnes & Thornburg

(57) ABSTRACT

A fluidization level sensor and controller for use in a fluidized patient support surface has a controller coupled to a sensor and a compressor. The patient support surface contains a mass of granular particles housed in frame walls and supported by a diffuser. The compressor forces a fluid, typically air, into a plenum chamber and through the diffuser. The fluid flows through the mass of granular particles, causing the mass of granular particles to fluidize, and exits through a fluid permeable sheet. The fluidization level sensor produces an output signal proportional to the fluidization level of the mass of granular particles, and provides this output signal to the controller. The controller generates a compressor control signal in response to the output of fluidization level sensor, which in turn adjusts the compressor to maintain a substantially constant fluidization level.

22 Claims, 5 Drawing Sheets

APPARATUS FOR SENSING AND CONTROLLING FLUIDIZATION LEVEL

CROSS-REFERENCE TO RELATED APPLICATION

This patent application is a continuation of U.S. patent application Ser. No. 09/614,647, filed on Jul. 12, 2000, and entitled "Apparatus and Method for Sensing and Controlling Fluidization Level", the disclosure of which is hereby incorporated in its entirety by reference.

BACKGROUND AND SUMMARY OF THE INVENTION

The invention relates to fluidized patient support systems, and more particularly, to fluidization level sensors and control systems for use with fluidized patient support systems.

Conventional patient support surfaces comprise a mattress-spring support layer with appropriate bed clothing and covering. Patients are sometimes immobile for long periods of convalescence, due to unconsciousness, coma, or paralysis, or are in a condition where movement is extremely painful. Prolonged patient contact with these conventional surfaces result in pressure points developing between the support surface and the patient's body. Decubitus ulcers often develop on the patient's skin at these pressure points, which further impedes the patient's recovery and require additional medical treatment. Furthermore, conventional patient support surfaces are not conducive to burn patients with burns to significant portions of their bodies. In addition to developing decubitus ulcers, burn patients are at risk of developing infection from fluids exuding from the burn wounds. Over a relatively short time, conventional patient support surfaces become saturated with this excess fluid. Additionally, since the burn wounds are extremely sensitive to any contact, conventional patient support surfaces cause much discomfort to the patient.

Fluidized patient support surfaces overcome many of the problems inherent in conventional patient support surfaces. A fluidized patient support surface typically comprises an open tank filled with a fine granular material, such as fine glass or ceramic beads. The granular material is covered with a fluid permeable sheet, upon which the patient rests. The bottom of the tank is a diffuser surface through which a compressor forces a fluid, typically air. The fluid flows through the granular material, causing motion within the granular material.

In a non-fluidized state, the granular material has a specific gravity higher than water; however, when the granular material is fluidized, the specific gravity of the granular material is reduced significantly, and approaches a specific gravity near, but still greater than, the specific gravity of water. Thus, the fluid flow is adjusted so that the granular material behaves in a fluid like fashion, with the fluid permeable sheet providing a pressure release surface. Accordingly, the fluidized patient support imparts gentle forces on the patient's body, and reduces the likelihood of developing decubitus ulcers. Furthermore, the fluid like behavior of the granular material provides a much more comfortable resting surface for burn patients.

The compressor mechanism of a fluidized patient support surface is adjusted to prevent over-fluidization and under-fluidization of the granular material. Over fluidization occurs when the fluid flow causes excessive turbulence in the granular material, which in turn creates a turbulent, boiling-like patient support surface that is uncomfortable and will also cause excessive heating of the granular material. Conversely, under-fluidization occurs when the fluid flow causes very little turbulence in the granular material, resulting in a hard patient support surface. Accordingly, the compressor mechanism is adjusted to ensure proper fluidization of the granular material.

A common problem occurring in fluidized patient support surfaces is the gradual wearing of the granular material. The surfaces of the granular particles become worn due to the abrasive action of the granular material motion. As these surfaces become worn, the granular material is less responsive to the fluid flowing through the diffuser, and thus the patient support surface tends to become under-fluidized. The compressor must then be adjusted to force more fluid through the diffuser to ensure that the patient support surface remains properly fluidized. The adjustment must also not be of such magnitude that the patient support surface becomes over fluidized. Thus, there is need for a fluidization control apparatus to maintain a substantially constant fluidization level independent of the wearing of the granular material.

According to the invention, a method and apparatus for sensing the fluidization level and controlling the fluidization level of a mass of granular material is provided. A fluidization sensing apparatus comprises a fluidization level sensor that outputs a signal proportional to the fluidization level of the granular material, and/or to the motion of the mass of granular material.

In one embodiment, the invention provides a fluidized patient support surface which includes a mass of granular particles, a compressor, a sensor, and a controller. The compressor produces fluid flow through the mass of granular particles causing the particles to fluidize. The sensor measures a fluidization level of the mass of granular particles, and produces a signal proportional to the fluidization level. The controller is coupled to the sensor, and receives a signal from the sensor and generates a control signal for controlling the level of fluid flow through the mass of granular particles.

In one embodiment, the control signal controls the level of fluid flow through the mass of granular particles so as to maintain a substantially constant fluidization level. The controller is preferably a proportional-integral (PI) controller. One embodiment of the controller comprises a high-pass filter coupled to an output of the sensor to remove low frequency noise, a peak detector having an input coupled to an output of the high-pass filter, and an integrator coupled to an output of the peak detector.

A variety of sensors may be used, including acoustic and infrared transducers. In one embodiment, an acoustic transducer in contact with the mass of granular material is employed. One infrared sensor, according to the present invention, comprises an emitter configured to emit an infrared signal, and a receiver configured to receive the infrared signal emitted by the emitter. The infrared sensor may be enclosed within a housing having a transparent side in contact with the mass of granular particles. The emitter is configured to emit an infrared signal through the transparent side, and the receiver is configured to receive the infrared signal and generate the signal proportional to the fluidization level. The transparent side may be formed from a material which serves as an optical filter and which is resistant to abrasion. One material from which the transparent side may be formed is a sapphire crystal. In certain embodiments, the housing includes a second transparent side, with the receiver being disposed to receive the infrared signal through the second transparent side.

One embodiment of the invention may also include an alarm indicator that is actuated when the signal proportional to the fluidization level or the control signal exceeds a threshold value. The alarm indicator may also be actuated when either signal falls below a predetermined threshold value.

In one embodiment, the invention further comprises a diffuser and a frame wall for confining at least a portion of the mass of granular particles. In certain instances, the sensor may be mounted on the frame wall.

Another aspect of the present invention provides apparatus for controlling the fluidization level of a mass of granular particles in a fluidized patient support system. The apparatus comprises a compressor in fluid communication with the mass of granular particles. The compressor is responsive to a compressor control signal and is configured to communicate a fluid through the mass of granular particles. The apparatus further comprises a sensor configured to output a fluidization control signal proportional to a fluidization level of the mass of granular particles. The apparatus further comprises a controller coupled to the output of the sensor and to the compressor. The controller generates a compressor control signal in response to the fluidization control signal to maintain a substantially constant fluidization level of the mass of granular particles.

Yet another aspect of the present invention is a method of controlling a fluidization level of a mass of granular particles in a fluidized patient support surface. The subject method comprises the steps of: (a) providing a controllable source of fluid to fluidize the mass of granular particles; (b) sensing the fluidization level of the mass of granular particles; (c) generating a control signal proportional to the fluidization level of the mass of granular particles; and (d) applying the control signal to a controller to adjust the source of fluid so as to achieve a desired level of fluidization. The sensing step of the method may further include providing an acoustic sensor within the mass of granular particles, or mounted to a wall or other surface adjacent the mass of granular particles. The sensing step may also include transmitting energy through at least a portion of the mass of granular particles, and receiving at least a portion of the transmitted energy as modulated by motion of the mass of granulated particles. The sensing step may further include mounting a transmitter and receiver adjacent a transparent side or sides of a housing disposed adjacent the mass of granular particles. The step of generating a control signal proportional to the fluidization level may comprise the steps of filtering an output signal produced by the sensing step, and conditioning the output signal through a peak detector.

Additional features, attainments, and advantages of the invention will become apparent to those skilled in the art upon consideration of the following detailed description when taken in conjunction with the accompanying drawings.

DETAILED DESCRIPTION OF THE DRAWINGS

Figure 1:
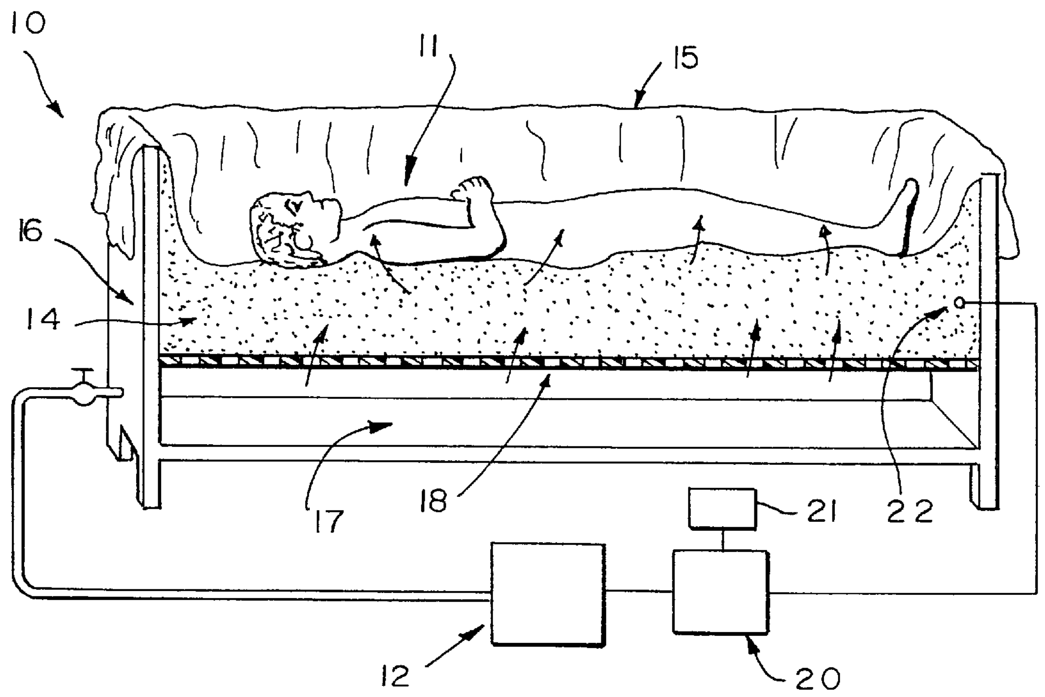
FIG. 1 is a diagram of the fluidization level sensor and control apparatus implemented in a fluidized patient support surface.

FIG. 1 shows a patient support surface 10 which incorporates the present invention. Patient support surface 10 contains a mass of granular particles 14 housed in frame walls 16 and supported by diffuser 18. Compressor 12 forces a fluid, typically air, into the plenum chamber 17 and through the diffuser 18. The fluid flows through the mass of granular particles 14, causing the mass of granular particles 14 to fluidize, and exits through a fluid permeable sheet 15. Fluidization level sensor 22 produces an output signal proportional to the fluidization level of the mass of granular particles 14, and provides this output signal to controller 20. Controller 20 generates a compressor control signal in response to the output of fluidization level sensor 22, which in turn adjusts compressor 12 to maintain a substantially constant fluidization level.

Also shown in FIG. 1 is an alarm module 21. Alarm 21 is actuated when the signal from the sensor, or the compressor control signal, or a corresponding intermediate signal exceeds, or drops below, a predetermined threshold value. Alarm 21 produces an indication which is of the audible, visual, tactile, or other known type, or any combination or sub-combination thereof.

Figure 2:
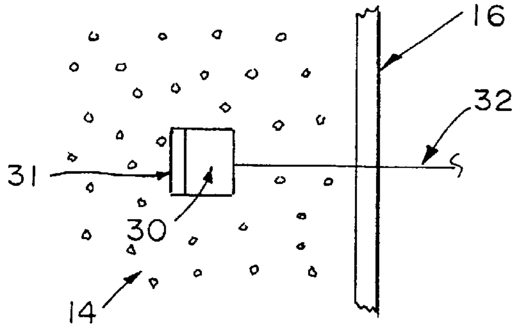
FIG. 2 depicts an acoustic transducer sensor configured to generate an output signal proportional to the fluidization level of the mass of granular material.
Figure 3:
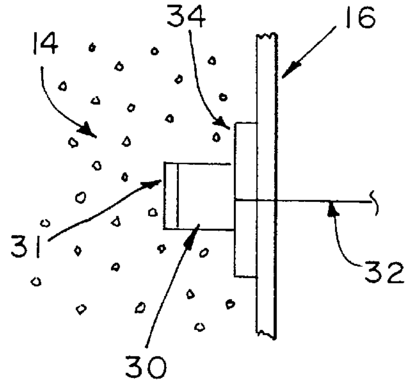
FIG. 3 depicts an acoustic transducer configured to generate an output signal proportional to the fluidization level of the mass of granular material, and mounted on an isolation mount coupled the frame wall.

In one embodiment, fluidization level sensor 22 is an acoustic transducer 30 as shown in FIG. 2. Acoustic transducer 30 has a face 31 in direct contact with the mass of granular particles 14. Transducer lead 32 penetrates the frame wall 16 and allows for transducer 30 to float freely in the mass of granular particles 14, thereby reducing acoustic coupling to environmental noise introduced through frame wall 16. Alternatively, transducer 30 may be acoustically isolated from frame wall 16 by an isolation mount 34, as shown in FIG. 3. Isolation mounts are well known in the art, the selections of which are determined by environmental characteristics such as compressor noise, ambient room noise, and the like.

Figure 4:
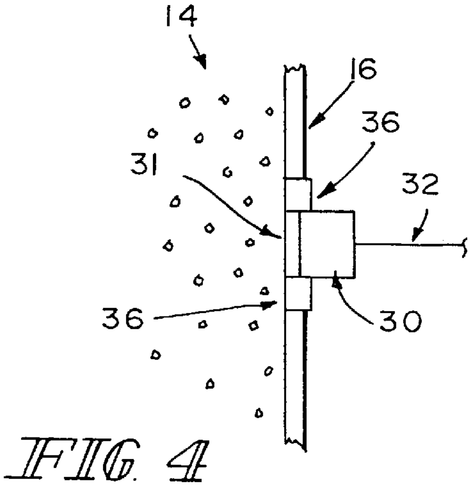
FIG. 4 depicts an acoustic transducer configured to generate an output signal proportional to the fluidization level of the mass of granular material, and mounted flush with the frame wall.

Another mounting technique is shown in FIG. 4. Transducer 30 is mounted such that transducer face 31 is flush with the interior surface of frame wall 16. An annular isolation mount 36 may be used to isolate transducer 30 from environmental noise.

In FIGS. 2, 3 and 4, transducer 30 has a face 31 in direct contact with mass of granular particles 14. When the mass of granular particles 14 is not fluidized, the individual particles of the mass of granular particles 14 in contact with transducer face 31 are stationary, and transducer 30 outputs a bias signal. This bias signal is the result of low frequency environmental noise transmitted into the granular mass. The source of such noise may be equipment operating within the room, acoustic coupling from the compressor 12, hospital generators, etc.

Upon fluidization of the mass of granular particles 14, the individual particles that comprise the mass of granular particles 14 impinge transducer face 31. As the mass of granular particles 14 becomes more fluidized, the individual particles of the mass of granular particles 14 impinge transducer face 31 at a higher frequency and greater intensity. Accordingly, transducer 30 generates an output signal proportional to the fluidization level of the mass of granular particles 14.

Figure 5:
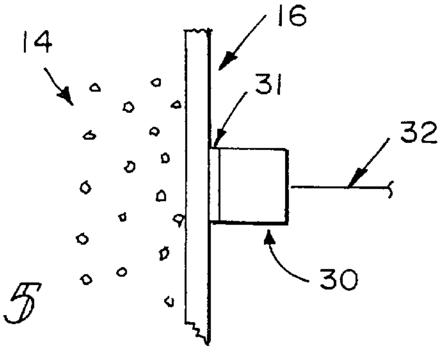
FIG. 5 depicts an acoustic transducer configured to generate an output signal proportional to the fluidization level of the mass of granular material, and coupled to the outer surface of the frame wall.

FIG. 5 shows another mounting scheme in which transducer 30 is directly coupled to frame wall 16. When the mass of granular particles 14 is not fluidized, the individual particles in contact with frame wall 16 are stationary, and transducer 30 outputs a bias signal. This bias signal is the result of low frequency environmental noise transmitted into the frame wall 16. The source of such noise may be equipment operating within the room, acoustic coupling from the compressor 12, hospital generators, etc. As the mass of granular particles 14 becomes more fluidized, the individual particles of the mass of granular particles 14 impinge frame wall 16 at a higher frequency and greater intensity. Accordingly, transducer 30 generates an output signal proportional to the fluidization level of the mass of granular particles 14.

Transducer face 31 may be constructed from a wear-resistant material, depending on the type of transducer 30 used. Alternatively, if the transducer 30 is a piezoelectric transducer, a standard design such as a Tonpilz projector will suffice.

Figure 6:
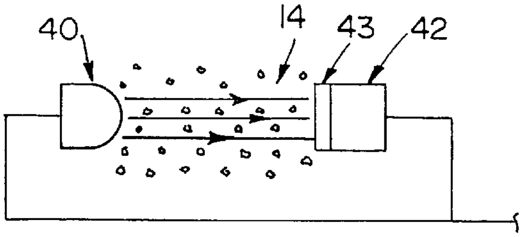
FIG. 6 depicts an infrared emitter and receiver configured to generate an output signal proportional to the fluidization level of the mass of granular material, the output signal generated by modulated light transmitted through the granular material.

FIG. 6 illustrates an infrared embodiment of the fluidization level sensor 22. Infrared emitter 40 and infrared receiver 42 are proximately spaced so that infrared light emitted from emitter 40 may be detected by receiver 42 having a receiving face 43. Emitter 40 and receiver 42 may be realized by a light emitting diode and a photodetector, respectively. The emitter 40 and receiver 42 are in direct contact with mass of granular particles 14. When the mass of granular particles 14 is not fluidized, the individual particles of the mass of granular particles 14 are stationary, and receiver 42 outputs a bias signal. This bias signal is proportional to the portion of the infrared energy emitted by emitter 40 that penetrates the region of mass of granular particles 14 between emitter 40 and receiving face 43. As the mass of granular particles 14 becomes more fluidized, the individual particles of the mass of granular particles 14 move at a higher frequency and greater intensity. The motion of the region of mass of granular particles 14 between emitter 40 and receiving face 43 modulates the infrared energy emitted by emitter 40. Accordingly, receiver 42 modulates the output signal in a manner proportional to the fluidization level of the mass of granular particles 14.

Figure 7:
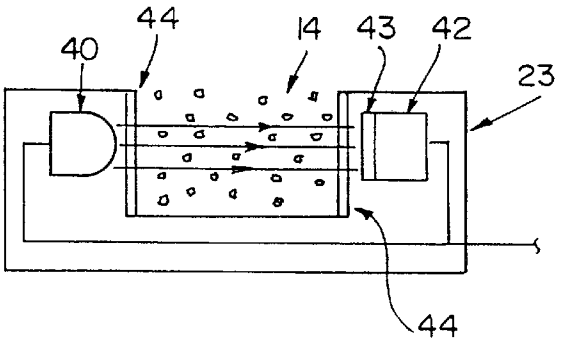
FIG. 7 depicts an infrared emitter and receiver mounted in a housing and configured to generate an output signal proportional to the fluidization level of the mass of granular material, the output signal generated by modulated light transmitted through the granular material.

FIG. 7 illustrates a variation of the embodiment shown in FIG. 6, in which the emitter 40 and receiver 42 are mounted inside a housing 23. Emitter 40 and receiver 42 are protected by transparent sides 44. Transparent sides 44 are included to protect the emitter 40 and receiver 42 from the motion of the mass of granular particles 14, which is abrasive. Accordingly, the transparent side 44 is preferably a scratch resistant material, such as a sapphire crystal material. Additionally, transparent side 44 may double as an optical filter, having an infrared transparent bandwidth that accommodates the infrared frequency of emitter 40, thus filtering out other light that may create undesired system noise.

Figure 8:
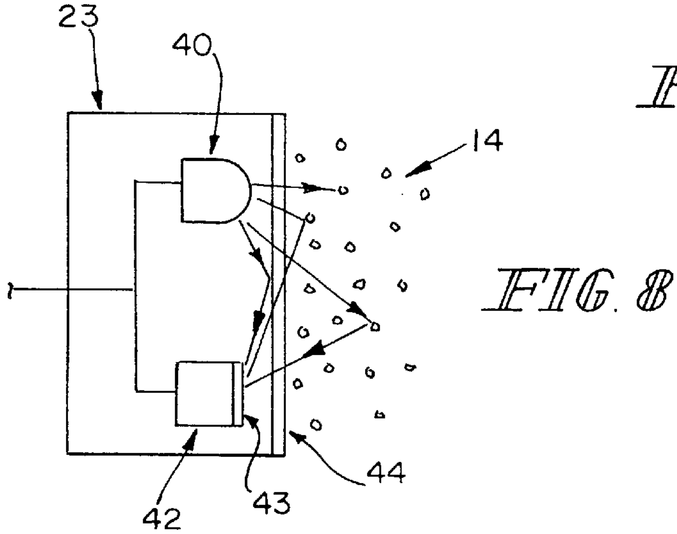
FIG. 8 depicts an infrared emitter and receiver mounted in a housing and configured to generate an output signal proportional to the fluidization level of the mass of granular material, the output signal generated by modulated light reflected back from the granular material.

FIG. 8 illustrates yet another alternative infrared embodiment of fluidization level sensor 22. Housing 23 has a transparent side 44, the outer side of transparent side 44 being in contact with the mass of granular particles 14. Infrared emitter 40 and receiver 42 are mounted inside the housing 23 and proximately spaced from the inner surface of transparent side 44. Emitter 40 is mounted so that infrared energy is transmitted through transparent side 44 and into mass of granular particles 14. When the mass of granular particles 14 is not fluidized, the individual particles of mass of granular particles 14 are stationary, and receiver 42 outputs a bias signal. This bias signal is proportional to the portion of the infrared energy emitted by emitter 40 that reflects off transparent side 44 and onto receiver face 43, and from reflection off the stationary mass of granular particles 14. As the mass of granular particles 14 becomes more fluidized, the individual particles of the mass of granular particles 14 move at a higher frequency and greater intensity. The motion of the region of mass of granular particles 14 proximate to the outer side of transparent side 44 modulates the backscatter reflection of the infrared energy emitted by emitter 40. This modulated infrared energy is incident to receiver face 43. Accordingly, receiver 42 modulates the output signal in a manner proportional to the fluidization level of the mass of granular particles 14.

Figure 9:
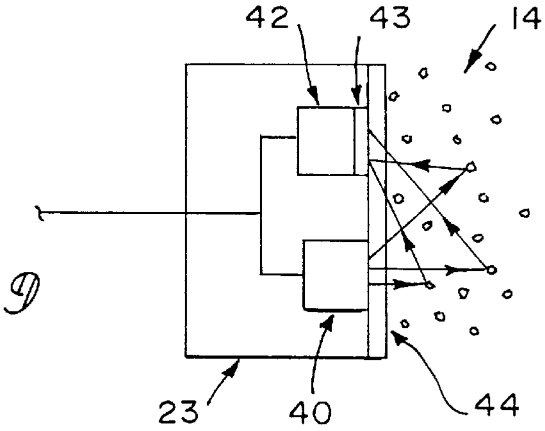
FIG. 9 depicts an infrared emitter and receiver mounted in a housing and configured to generate an output signal proportional to the fluidization level of the mass of granular material, the output signal generated by modulated light reflected back from the granular material.

FIG. 9 shows another infrared embodiment of fluidization level sensor 22 similar to that shown in FIG. 8, except emitter 40 and receiver 42 are coupled to the inside of transparent side 44 to reduce internal reflections of infrared energy received by receiver 42.

The motion of the mass of granular particles 14 will wear the outer surfaces of transparent side 44. Accordingly, transparent side 44 is preferably a scratch resistant material, such as a sapphire crystal side. Additionally, transparent side 44 may double as an optical filter, having an infrared transparent bandwidth that accommodates the infrared frequency of emitter 40, and thus filters out other light that may create undesired system noise.

As will be readily appreciated by those of ordinary skill in the art, the fluidization level sensor 22 may be realized utilizing other energy sources, such as a laser proximately spaced from a photodetector, or an acoustic transmitter proximately spaced from an acoustic receiver, or an active transmit and receive transducer.

Figure 10:
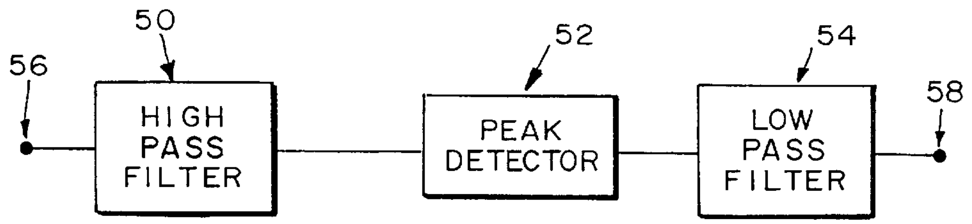
FIG. 10 is a block diagram of a control apparatus.

A block diagram of an illustrative embodiment of the controller is provided in FIG. 10. Fluidization level sensor 22 provides a fluidization level signal at input 56. The signal is filtered through high pass filter 50, and input to peak detector 52. Peak detector 52 holds the peak value of the high pass filtered fluidization level signal, which in turn is low pass filtered through low pass filter 54. Low pass filter 54 generates the corresponding compressor control signal 58. The high pass filter 50, peak detector 52 and low pass filter 54 may be implemented using common analog or digital filtering techniques.

Figure 11:
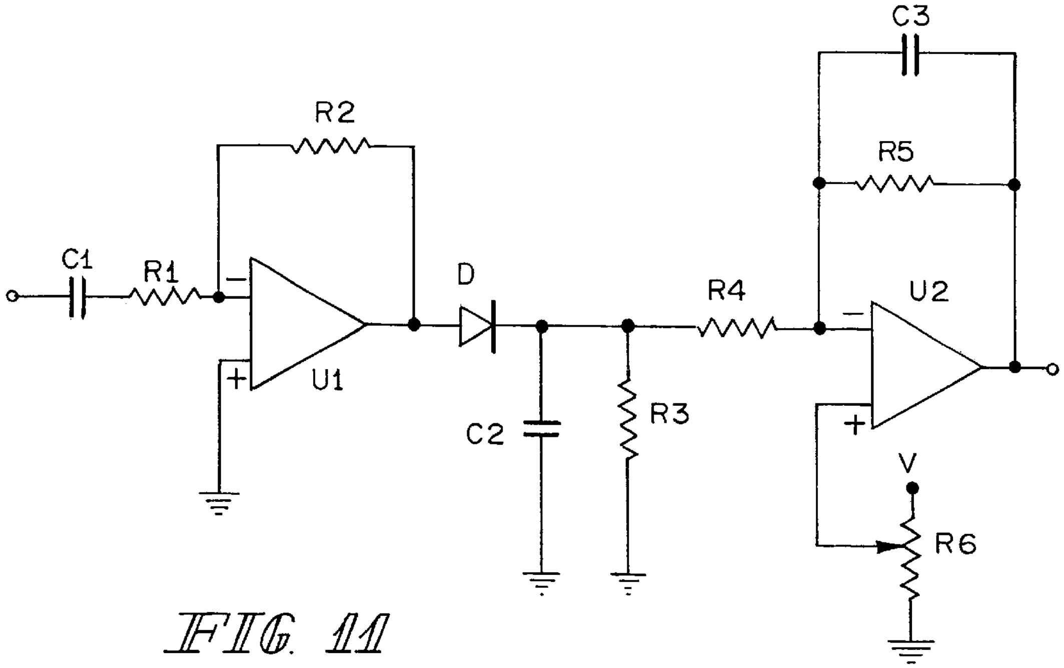
FIG. 11 is an illustrative embodiment of the control apparatus of FIG. 10.

FIG. 11 illustrates a particular embodiment of the controller implemented as a simple proportional-integral (PI) controller. As will be readily appreciated by one skilled in the art, the controller may also be implemented using a digital filter and controller. The fluidization level sensor 22 output signal is provided to the input of the single pole high pass filter defined by capacitor C1, resistors R1 and R2, and operational amplifier U1. The filtered output of operational amplifier U1 is provided to the peak detector defined by diode D1, capacitor C2 and resistor R3. Capacitor C2 charges and holds the peak value of the filtered output of U1, and bleeds off this value through the single pole low pass filter defined by resistors R4 and R5, capacitor C3 and operational amplifier U2. Resistor R3 bypasses capacitor C2, and is typically large, on the order of 10 MΩ or greater. The potentiometer R6 coupled to voltage supply V provides a reference voltage set point to the non-inverting input of the operational amplifier U2.

As will be readily appreciated by those skilled in the art, a multiple pole high pass filter 50 and/or a multiple pole low pass filter 54 may be substituted for the single pole filters described in the above embodiment. Again, each may be implement using common analog or digital techniques.

In operation, diode D1 becomes forward biased and conducts if the high pass filtered output of operational amplifier U1 exceeds the voltage of capacitor C2. The voltage of capacitor C2 is provided to the inverting terminal of operational amplifier U2 and conditioned through the single pole low pass filter. The output of operational amplifier U2 is provided as the compressor control signal, and the compressor 12 is thereby adjusted to maintain a substantially constant fluidization level of the mass of granular particles 14.

Figure 12:
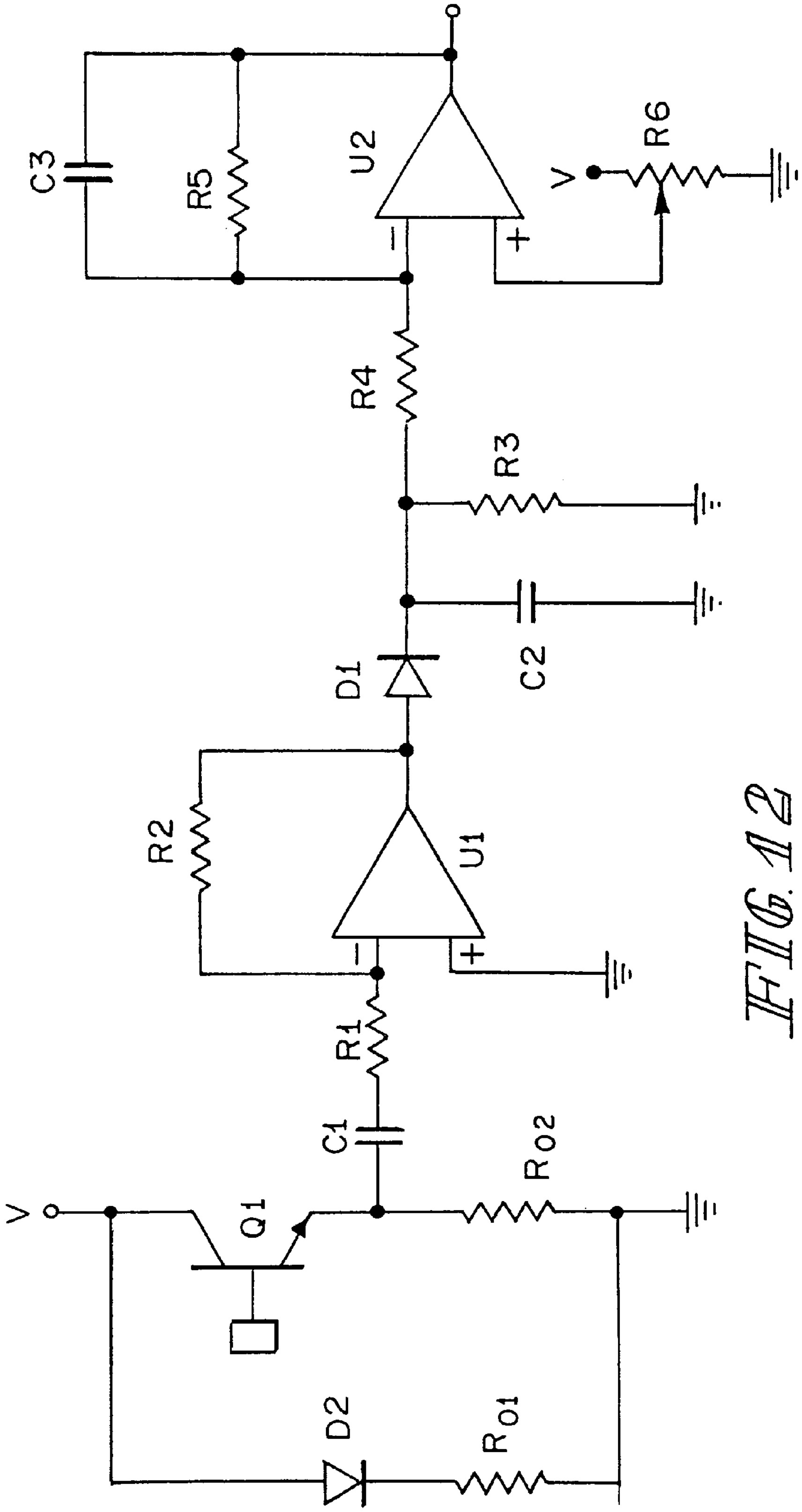
FIG. 12 is an illustrative embodiment of the control apparatus of FIG. 11 coupled to an infrared emitter and receiver.

FIG. 12 illustrates an embodiment in which an infrared stage is coupled to the control apparatus of FIG. 11. Infrared diode D2 is biased with a constant current equal to the power supply voltage V divided by the resistance sum of serial resistor $R_{o1}$ and the internal resistance of diode D2. Phototransistor Q1 is connected in an emitter follower scheme, the output of which is coupled to the input 56 of the fluidization control apparatus. The base of phototransistor Q1 receives light from infrared diode D2 and generates carriers, thus activating phototransistor Q1. As will be readily appreciated by those skilled in the art, other infrared receiving devices may be substituted for phototransistor Q1.

As the individual elements of the mass of granular particles 14 become worn, the mass of granular particles 14 becomes less responsive to the fluid flow driven by compressor 12, thereby affecting the closed loop response. As the compressor 12 must force more fluid through the mass of granular particles 14 to maintain the proper fluidization level, the mass of granular particles 14 begins to generate more heat. Eventually the fluidized patient support surface 10 becomes uncomfortable to the patient 11 and the entire granular mass must be replaced. As the heating of the mass of granular particles 14 is proportional to the amount of fluid flowing through it, controller 20 may be configured to monitor the compressor control signal or the fluidization level sensor 22 output and indicate an alarm condition if the compressor control signal or the fluidization level sensor 22 output exceeds a threshold value, thus indicating that the granular particles 14 may be approaching the end of useful life. An alternative arrangement, whereby the compressor control signal or the fluidization level sensor output signal is monitored to activate an alarm if the signal is less than a threshold value, is also contemplated.

In recapitulation, there has been provided apparatus including a sensor for measuring the fluidization level of a mass of fluidized granular particles and a fluidized patient support surface incorporating the apparatus. While the invention has been described in conjunction with described embodiments thereof, other alternatives, modifications, and variations are possible. For instance, while the present invention is described with respect to patient support surface 10, other patient support surfaces are possible. A fluidized patient support surface including flexible walls, such as that described in U.S. Pat. No. 4,942,635, hereby incorporated by reference, may also incorporate the present invention. It is also possible to use the present invention in combination with flexible walled bladders having fluidizable particles. Accordingly, it is intended to embrace all such alternatives, modifications, and variations that fall within the spirit and broad scope of the appended claims.

What is claimed is:

1. A sensor for measuring the fluidization level of a mass of fluidized granular particles, comprising:

a housing having a first transparent side having a first surface in contact with the mass of granular particles;

an emitter disposed adjacent a second surface of the first transparent side and configured to emit an infrared signal through the first transparent side; and a receiver configured to receive the infrared signal and generate a corresponding output signal.

2. The sensor of claim 1, wherein the receiver is spaced apart from the emitter.

3. The sensor of claim 2, wherein the first transparent side is an optical filter.

4. The sensor of claim 3, wherein the first transparent side is a sapphire crystal.

5. The sensor of claim 1, further comprising a second transparent side having a first surface in contact with the mass of granular particles.

6. The sensor of claim 5, wherein the receiver is disposed adjacent a second surface of the second transparent side.

7. The sensor of claim 6, wherein the first and second transparent sides are optical filters.

8. The sensor of claim 7, wherein the first and second transparent sides are sapphire crystals.

9. The sensor of claim 1, wherein the receiver measures the frequency of movement of the mass of granular particles and produces a signal proportional to said frequency of movement.

10. The sensor of claim 1, wherein the receiver measures the intensity of movement of the mass of granular particles and produces a signal proportional to said intensity of movement.

11. The sensor of claim 1, wherein the receiver measures the frequency and intensity of movement of the mass of granular particles and produces a signal proportional to said frequency and intensity of movement.

12. A sensor for measuring the motion of a mass of fluidized granular particles and producing an output signal proportional to said motion, comprising:

a housing having a first transparent side having a first surface in contact with the mass of granular particles;

an emitter disposed adjacent a second surface of the first transparent side and configured to emit an infrared signal through the first transparent side; and a receiver configured to receive the infrared signal proportional to the motion of the mass of fluidized granular particles and generate an output signal proportional to said motion.

13. The sensor of claim 12 wherein the receiver is spaced apart from the emitter.

14. The sensor of claim 13, wherein the first transparent side is an optical filter.

15. The sensor of claim 14, wherein the first transparent side is a sapphire crystal.

16. The sensor of claim 12, further comprising a second transparent side having a first surface in contact with the mass of granular particles.

17. The sensor of claim 16, wherein the receiver is disposed adjacent a second surface of the second transparent side.

18. The sensor of claim 17, wherein the first and second transparent sides are optical filters.

19. The sensor of claim 18, wherein the first and second transparent sides are sapphire crystals.

20. The sensor of claim 12, wherein the receiver measures the frequency of movement of the mass of granular particles and produces a signal proportional to said frequency of movement.

21. The sensor of claim 12, wherein the receiver measures the intensity of movement of the mass of granular particles and produces a signal proportional to said intensity of movement.

22. The sensor of claim 12, wherein the receiver measures the frequency and intensity of movement of the mass of granular particles and produces a signal proportional to said frequency and intensity of movement.

* * * * *